Sept. 6, 1960 A. WACHTEL 2,951,813
METHOD OF PREPARING AN ELECTROLUMINESCENT
ZINC SULFIDE PHOSPHOR
Filed Dec. 24, 1956
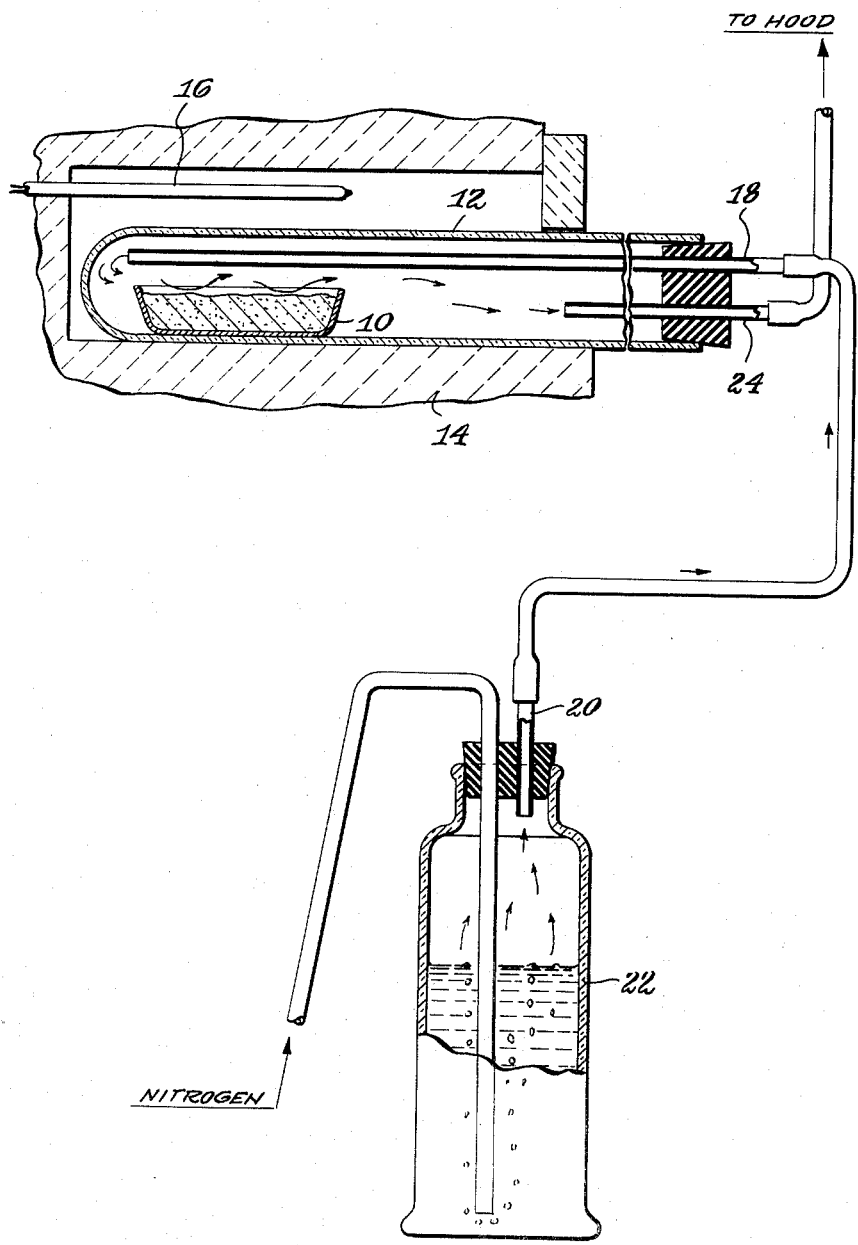
INVENTOR.
ANSELM WACHTEL.
BY W. D. Palmer
ATTORNEY.

United States Patent Office 2,951,813
Patented Sept. 6, 1960

2,951,813
METHOD OF PREPARING AN ELECTROLUMINESCENT ZINC SULFIDE PHOSPHOR

Anselm Wachtel, Sayreville, N.J., assignor to Westinghouse Electric Corporation, East Pittsburgh, Pa., a corporation of Pennsylvania Filed Dec. 24, 1956, Ser. No. 630,353
6 Claims. (Cl. 252—301.6)

This invention relates to electroluminescent zinc-sulfide phosphors and, more particularly, to a method for improving the brightness of such phosphors.

There is disclosed in copending application of Willi Lehmann, S.N. 630,354, titled "Phosphor," filed concurrently herewith and owned by the present assignee, a method for producing a zinc-sulfide phosphor which is activated by copper and coactivated by halogen, wherein the phosphor is prepared by firing in an atmosphere comprising sulphur vapor. This results in greatly enhancing the brightness and efficiency of the phosphor. While the brightness and efficiency of the phosphor as disclosed by Lehmann, greatly exceeds anything reported to date, it is desirable to increase the phosphor brightness still more.

It is the general object of this invention to provide a method for synthesizing a zinc sulfide, copper-activated electroluminescent phosphor, wherein a greatly-increased brightness may be achieved.

It is a further object to provide various firing conditions for achieving a maximum of brightness.

It is another object to provide a supplemental washing treatment for the prepared phosphor, which treatment will further enhance the brightness of the phosphor.

The aforesaid objects of the invention, and other objects which will become apparent as the description proceeds, are achieved by firing the phosphor raw-mix constituents while introducing into the firing container or receptacle an inert gas which carries admixed therewith and in gaseous form, sulphur and the phosphor coactivating constituent, with the inert-gas-carried sulphur and phosphor coactivating constituent being in approximately the same gram-atom concentration.

For a better understanding of the invention, reference should be had to the accompanying drawing, wherein the sole figure illustrates a sectional view of a firing furnace for preparing the improved zinc-sulfide electroluminescent phosphor.

The improved phosphor of this invention comprises zinc-sulfide phosphor which is activated by copper and co-activated by chlorine. This phosphor is prepared by firing in an atmosphere which has introduced thereto sulphur and the coactivating chlorine. With respect to so-called coactivators, the latest theories and experiments indicate that the coactivator is required to balance the valency of the activator which is introduced into the phosphor. In the instant case, the specified "coactivating chlorine" has a "minus one" valency and is introduced so that a "plus one" activator cuprous ion and a "plus two" zinc ion will have the exact opposite charge as a "minus one" coactivator chlorine ion and a "minus two" sulphur ion. Thus the charges in the phosphor matrix are compensated or balanced.

It should be noted that the prior art has taught the introduction of hydrogen sulfide into the firing atmosphere, with or without the simultaneous introduction of hydrogen chloride into the firing atmosphere. However, phosphors which have been fired during preparation in an atmosphere comprising hydrogen sulfide have been found to have considerably lower brightness than phosphors which have been fired during preparation in an atmosphere comprising sulphur vapor.

It has been found that for best results, the sulphur in the firing atmosphere and the coactivating chlorine which the phosphor can assimilate during firing, should be present in the firing atmosphere in approximately equal gram-atom proportion. In other words, for every atom of sulphur which is present in the firing atmosphere, there should be an atom of coactivating chlorine available for the phosphor to assimilate.

In preparing the phosphor material, finely-divided zinc sulfide and copper-containing compound are thoroughly admixed. With specific reference to the drawing, this raw-mix admixture is placed into a firing tray 10, which tray is in turn placed in a firing container or receptacle 12 located within the firing furnace 14. The separate firing container 12, which may be a silica tube, for example, may be dispensed with, if desired, and the firing tray 10 placed directly into the furnace 14, which furnace then becomes the firing container. However, from the standpoint of convenience, a separate firing container 12 is desired. The temperature during firing may be measured with a thermocouple 16 inside the firing furnace 14 and controlled within limits as specified hereinafter. A firing-atmosphere-supplying tube 18 is connected through the stoppered end of the firing container 12 to the outlet side 20 of a gas-scrubbing bottle 22.

The simplest and most convenient method for introducing sulphur and coactivating chlorine into the firing container atmosphere is approximately the same gram-atom proportion, is to introduce into the firing container 12, during the firing, an inert gas which carries a sulphur and chlorine-containing compound, which compound combines these elements in approximately the same gram-atom proportion. This may readily be achieved by passing nitrogen through sulphur monochloride which is contained in the gas-scrubbing bottle 22. Upon being passed through the sulphur monochloride, the nitrogen gas picks up vapors of this compound and this inert gas and admixed sulphur monochloride vapor are introduced into the firing container 12 through the firing-atmosphere-supplying tube 18. Excessive pressures in the atmosphere within the firing container 12 are relieved through the outlet aperture 24 in the stoppered end of the firing container 12, and these excess gas pressures may be vented through a hood.

The phosphor raw-mix admixture principally comprises zinc sulfide and copper-containing compound. The copper-containing compound in the phosphor raw-mix admixture may comprise copper acetate, copper nitrate, copper sulphate, or mixtures thereof, for example. It should be noted that copper acetate is preferred. Small amounts of other zinc compounds, for example, such as zinc oxide may be tolerated, particularly if an organic copper salt is used as a source of copper in the phosphor raw-mix admixture. This copper-containing compound is admixed with zinc sulphide in amounts of from 0.004 gram-atom of copper to 0.012 gram-atom of copper per mole of zinc sulfide and the preferred amount of copper is about 0.008 gram-atom of copper per mole of zinc sulfide in the phosphor raw-mix admixture. Following is a specific example for preparing phosphor raw-mix admixture.

*Example I*

| Phosphor Constituent | Preferred Amount, grams | Permissible Amounts, grams |
| --- | --- | --- |
| ZnS | 50 | 50 |
| $Cu(C_2H_3O_2)_2 \cdot H_2O$ | 0.82 | 0.41 to 1.23 |

NOTE.—Other copper-containing compounds may be substituted for the copper acetate as noted hereinbefore or these other copper-containing compounds may be admixed, such as admixed copper nitrate and copper acetate in equal parts, for example. As noted hereinbefore, small concentrations of zinc oxide, for example, may be tolerated. In addition, a wet-mixing technique is preferred.

As a specific example, the 50 gram batch of zinc sulfide and copper-containing compound is placed into the firing tray 10 and loaded into the firing container 12. The firing container is first flushed with inert gas such as nitrogen or a nitrogen and sulphur monochloride admixture, for example, in order to remove substantially all oxygen. The batch is then fired. The firing temperatures may vary from 850° C. to 1000° C. for at least 1 hour and the length of the firing has not been found to be critical. The best firing conditions have been found to be about 950° C. for about one and one-half hours. During the firing, the nitrogen is passed through the sulphur monochloride in the gas-scrubbing bottle 22 at the rate of 100 to 200 milliliters per minute. This rate of nitrogen passing has not been found to be critical, but for preparing a batch of the indicated size, this indicated flow of nitrogen has been found to be very satisfactory. The concentration of the sulphur monochloride which is admixed with the nitrogen will depend upon the temperature of the nitrogen and the temperature of the sulphur monochloride. Good results have been achieved when the nitrogen flush and the sulphur monochloride are both at room temperature (25° C.), although the temperature of the nitrogen inert gas as it is passed through the sulphur monochloride and the temperature of the sulphur monochloride have not been found to be critical and the concentration of sulphur monochloride in the nitrogen may vary considerably. It should be noted that inert gases other than nitrogen such as the noble gases may be used to carry the sulphur monochloride vapor, for example, into the firing tube 12, although nitrogen is preferred from the standpoint of expense. Also, mixtures of inert gases may be used. The sulphur monochloride may contain limited amounts of higher sulphur chlorides, as are common on this compound, as well as limited amounts of other impurities, as are common in the technical grade of this compound, although it is preferable that this compound is as pure as possible.

Upon being introduced into the firing container 12, it is assumed that the sulphur monochloride at least partially dissociates into sulphur and chlorine. Instead of using sulphur monochloride, per se, it is permissible to introduce separately into the firing container 12 approximately equal gram-atom proportions of sulphur vapor and chlorine gas. This may be accomplished by utilizing a preheating furnace to vaporize the sulphur and then controlling the rate at which the sulphur vapor and chlorine are introduced into the firing tube 12 so that they are introduced in approximately the same gram-atom proportion. In addition, the sulphur monochloride vapor or sulphur vapor and chlorine gas, which are carried by the inert gas into the firing container, may be admixed if desired, such as by admixing equal weights, for example, of sulphur monochloride vapor and sulphur vapor and chlorine gas.

After firing for the prescribed time, the fired phosphor batch is cooled in an atmosphere which is substantially free from oxygen. This is readily accomplished by allowing the fired batch to cool in the firing container 12 while maintaining an atmosphere of inert gas such as nitrogen, for example, in the firing container 12.

In order to realize the maximum brightness from the phosphor, it is preferable to use a double-firing procedure. In such a double-firing procedure, the first-fired batch is cooled as hereinbefore prescribed and is then removed from the firing container. This first-fired batch is examined under ultraviolet excitation, such as 3650 A.U. excitation, and any non-fluorescing surface layers preferably are physically removed from the first-fired phosphor. The fluorescing residuum of the fired admixture is then lightly crushed, as with a mortar and pestle. This light-crushed phosphor is then placed into a firing receptacle 12 and is fired as in the first firing at a temperature of from 850° C. to 1000° C. for at least 1 hour, with the best firing conditions being a firing temperature of about 950° C. for a period of about one and one-half hours. The conditions under which the second firing is conducted are the same as for the first firing, including the first flushing with inert gas such as nitrogen or nitrogen and sulphur monochloride admixtures, for example, to remove substantially all oxygen. The firing is then conducted while introducing into the firing container the atmosphere comprising the inert gas such as nitrogen which carries vapors of sulphur monochloride or sulphur vapor and chlorine gas, or mixtures of these vapors. After second firing, the phosphor batch is again cooled in an atmosphere which is substantially free from oxygen and as in the first firing, this is conveniently accomplished by continuing a nitrogen flushing, for example, while allowing the second-fired phosphor batch in the firing container 12 to cool. Any non-fluorescing portions of the second-fired batch preferably are then physically removed, as after the first firing, and the phosphor is then lightly crushed and preferably screened to remove any large particles.

Whether a single or a double-firing procedure is utilized, it is desirable to wash the material after final firing in a solution which is a solvent for cuprous sulfide, but which is not a solvent for zinc sulfide, such as a two-normal solution of potassium or sodium cyanide. In such a washing procedure, the fired and cooled phosphor material is removed from the firing tube 12, the non-fluorescing portion preferably removed and the phosphor residuum is carefully crushed to a powder and screened to remove large particles, as noted hereinbefore. The material is then washed in the solution of sodium or potassium cyanide and the washed phosphor is separated from the washing solution and dried. It should be noted that the concentration of the washing solution is not critical and may vary over wide limits without appreciably affecting the results.

The preferred procedure for washing the cooled phosphor with a solution which is a solvent for cuprous sulfide, but which is not a solvent for zinc sulfide, requires lightly crushing the fired or refired admixture sufficiently to pass through an 8 to 20 mesh screen. This screened-phosphor admixture is then boiled in the solution which is a solvent for cuprous sulfide, but which is not a solvent for zinc sulfide for from 10 to 20 minutes. The phosphor and solvent is then cooled for at least one hour and thereafter the solvent solution is decanted from the phosphor. The remaining phosphor is then gently crushed while still wet so as to break up substantially all agglomerates. This gentle crushing may be effected in a high-speed rotary homogenizer, such as a "Waring Blendor," for example. Thereafter the crushed powder is washed in water to remove any residual solvent solution. The water is then decanted and the phosphor is thereafter washed in a solution which is a solvent for zinc oxide but which is not a solvent for zinc sulfide, such as a one-normal solution of acetic acid at a temperature of 90° C., for example. The concentration of this second solvent wash is not critical. The resulting doubly-washed phosphor material is separated from the acetic-acid wash by decanting and is again washed with water and is thereafter dried at a temperature not exceeding about 140° C., and preferably not exceeding about 120° C. The dried phosphor is then screened to remove coarse particles.

The best results have been achieved utilizing the firing atmosphere which has the sulphur monochloride introduced therein. Phosphors which have been prepared by this method have been embedded in a high-dielectric material such as polyvinyl-chloride acetate and incorporated into an electroluminescent cell, in accordance with the usual techniques. When operated at maximum field strengths and $10^4$ c.p.s. field frequency, these electroluminescent cells have displayed a surface brightness considerably over twice the brightness of a normal 40 w. T12 fluorescent lamp. This brightness is considerably greater than any brightness reported heretofore.

It will be recognized that the objects of the invention have been achieved by providing a method for synthesizing a zinc-sulfide, copper-activated electroluminescent phosphor which operates with a greatly increased brightness and firing conditions for achieving this increased brightness have been provided. In addition, a supplemental washing treatment for the prepared phosphor has been provided.

As a possible alternative embodiment, small amounts of sulphur and chloride may be incorporated into the phosphor raw-mix admixture. For example, additional sulphur may be included in the phosphor raw-mix and small amounts of chloride may be contained in the phosphor raw-mix. However, the introduction of sulphur and chlorine in approximately the same gram-atom proportion into the atmosphere of the firing container for at least the minimum specified time is necessary to achieve the improved performance disclosed herein.

While in accordance with the patent statutes, one best-known embodiment of the invention has been illustrated and described in detail, it is to be particularly understood that the invention is not limited thereto or thereby.

I claim:

1. The method of preparing an electroluminescent zinc sulfide phosphor activated by copper and coactivated by chlorine, comprising admixing zinc sulfide and copper-containing compound, said admixture containing about 0.008 gram-atom of copper in compound form per mole of zinc sulfide, placing said admixture into a firing container, firing said admixture at a temperature of about 950° C. for about one and one-half hours while introducing into said firing container an atmosphere comprising nitrogen gas having admixed therewith sulphur monochloride vapor, and cooling said fired admixture in an atmosphere which is substantially free from oxygen.

2. The method of preparing an electroluminescent zinc sulfide phosphor activated by copper and coactivated by chlorine, comprising admixing zinc sulfide and copper-containing compound, said admixture containing from 0.004 to 0.012 gram-atom of copper in compound form per mole of zinc sulfide, placing said admixture into a firing container, firing said admixture at a temperature of from 850° C. to 1000° C. for at least one hour while introducing into said firing container an atmosphere comprising insert gas having sulphur monochloride vapor admixed therewith, and cooling said fired admixture in an atmosphere which is substantially free from oxygen.

3. The method of preparing an electroluminescent zinc sulfide phosphor activated by copper and coactivated by chlorine, comprising admixing zinc sulfide and copper-containing compound, said admixture containing from 0.004 to 0.012 gram-atom of copper in compound form per mole of zinc sulfide, placing said admixture into a firing container, firing said admixture at a temperature of from 850° C. to 1000° C. for at least one hour while introducing into said firing container an atmosphere comprising inert gas having sulphur monochloride vapor admixed therewith, cooling said fired admixture in an atmosphere which is substantially free from oxygen, removing any non-fluorescing portions of said fired admixture, lightly crushing the fluorescing residuum of said fired admixture, placing said residuum into a firing receptacle, firing said residuum at a temperature of from 850° C. to 1000° C. for at least one hour while introducing into said firing container an atmosphere comprising inert gas having sulphur monochloride vapor admixed therewith, and cooling said fired admixture in an atmosphere which is substantially free from oxygen.

4. The method of preparing an electroluminescent zinc sulfide phosphor activated by chlorine, comprising admixing zinc sulfide and copper-containing compound, said admixture containing about 0.008 gram-atom of copper in compound form per mole of zinc sulfide, placing said admixture into a firing container, firing said admixture at a temperature of about 950° C. for about one and one-half hours while introducing into said firing container an atmosphere comprising nitrogen having sulphur monochloride vapor admixed therewith, cooling said fired admixture in an atmosphere which is substantially free from oxygen, removing any non-fluorescing portions of said fired admixture, lightly crushing the fluorescing residuum of said fired admixture, placing said residuum into a firing receptacle, firing said residuum at a temperature of from about 950° C. for about one and one-half hours while introducing into said firing container an atmosphere comprising nitrogen having sulphur monochloride vapor admixed therewith, and cooling said fired admixture in an atmosphere which is substantially free from oxygen.

5. The method of preparing an electroluminescent zinc sulfide phosphor activated by copper and coactivated by chlorine, comprising admixing zinc sulfide and copper-containing compound, said admixture containing from 0.004 to 0.012 gram-atom of copper in compound form per mole of zinc sulfide, placing said admixture into a firing container, firing said admixture at a temperature of from 850° C. to 1000° C. for at least one hour while introducing into said firing container an atmosphere comprising inert gas having admixed therewith sulphur monochloride vapor, cooling said fired admixture in an atmosphere which is substantially free from oxygen, removing any non-fluorescing portions of said fired admixture, lightly crushing the fluorescing residuum of said fired admixture, placing said residuum into a firing receptacle, firing said residuum at a temperature of from 850° C. to 1000° C. for a least one hour while introducing into said firing container an atmosphere comprising inert gas having admixed therewith sulphur monochloride vapor, cooling said fired admixture in an atmosphere which is substantially free from oxygen, removing any non-fluorescing portions of said fired residuum, lightly crushing the portions of said fired residuum which display fluorescence, and washing said crushed residuum in a solution which is a solvent for cuprous sulfide but which is not a solvent for zinc sulfide.

6. The method of preparing an electroluminescent zinc sulfide phosphor activated by copper and coactivated by chlorine, which method comprises forming a zinc sulfide and copper-containing compound phosphor raw-mix material which contains from 0.004 to 0.012 gram-atom of copper in compound form per mole of zinc sulfide, placing said phosphor raw-mix material into a firing container, forming a firing atmosphere by passing nitrogen gas at a temperature of 25° C. and at a rate of from 100 to 200 milliliters per minute through a gas-scrubbing bottle containing sulphur monochloride at a temperature of 25° C., introducing said firing atmosphere into said firing container while firing said phosphor raw-mix material at a temperature of from 850° C. to 1000° C. for at least one hour, and cooling said fired phosphor material in an atmosphere which is substantially free from oxygen.

References Cited in the file of this patent

UNITED STATES PATENTS

| 2,541,384 | Rothschild | Feb. 13, 1951 |
| 2,623,858 | Kroger | Dec. 30, 1952 |
| 2,743,237 | Froelich | Apr. 24, 1956 |
| 2,847,386 | Mazo | Aug. 12, 1958 |

OTHER REFERENCES

Kroger: "The Fluorescence of Zinc Sulfide Activated with Copper," Physica XV, No. 11–12, December 1949, pp. 990–1017.

Zalm: Philips Research Reports, vol. 9, No. 2, April 1954, pp. 81–108.